United States Patent
Beaucaire et al.

(10) Patent No.: US 11,858,346 B1
(45) Date of Patent: Jan. 2, 2024

(54) SYSTEMS AND METHODS FOR MANAGING DIESEL-POWERED VEHICLE FOLLOWING DISTANCE

(71) Applicant: International Engine Intellectual Property Company, LLC, Lisle, IL (US)

(72) Inventors: James Thomas Beaucaire, Wheaton, IL (US); Paul Anton Wieshuber, Naperville, IL (US)

(73) Assignee: International Engine Intellectual Property Company, LLC, Lisle, IL (US)

( * ) Notice: Subject to any disclaimer, the term of this patent is extended or adjusted under 35 U.S.C. 154(b) by 0 days.

(21) Appl. No.: 17/881,247

(22) Filed: Aug. 4, 2022

(51) Int. Cl.
  *F02D 41/38* (2006.01)
  *B60K 31/00* (2006.01)

(52) U.S. Cl.
  CPC ............. *B60K 31/00* (2013.01); *F02D 41/38* (2013.01); *B60Y 2300/16* (2013.01); *B60Y 2300/432* (2013.01); *F02D 2041/389* (2013.01)

(58) Field of Classification Search
  CPC ... F02D 41/38; F02D 2041/389; B60K 31/00; B60Y 2300/16; B60Y 2300/432
  USPC .... 123/299, 300, 436, 492, 493; 701/93, 96, 701/103, 104, 110
  See application file for complete search history.

(56) References Cited

U.S. PATENT DOCUMENTS

2015/0307099 A1   10/2015   Dextreit et al.

FOREIGN PATENT DOCUMENTS

| CN | 101078378 | * | 11/2007 | ............. F02D 45/00 |
| DE | 102011050739 | A1 | 12/2012 | |
| DE | 102016012414 | A1 | 5/2017 | |
| DE | 102018119796 | A1 | 2/2020 | |
| JP | 2004017867 | * | 1/2004 | ............. F02D 29/02 |
| JP | 3739619 | * | 1/2006 | ............. F02D 29/02 |
| JP | 3740891 | * | 2/2006 | ............. F02D 41/12 |

OTHER PUBLICATIONS

International Search Report and Written Opinion for PCT/US2023/027328, dated Oct. 26, 2023 (11 pages).

* cited by examiner

*Primary Examiner* — Hai H Huynh
(74) *Attorney, Agent, or Firm* — Mark C. Bach

(57) ABSTRACT

Disclosed herein are systems and methods, implementable in a vehicle equipped with adaptive cruise control, for maintaining in a subject vehicle substantially constant following distance relative to a preceding target vehicle where there has been a change in slope of a surface on which the subject vehicle is travelling and/or where pitch of the subject vehicle has changed. Systems and methods disclosed herein may maintain such substantially constant following distance by managing engine torque. Such engine torque management effective for maintaining substantially constant following distance relative to a preceding target vehicle, notwithstanding change in driving surface slope and/or change in pitch of the subject vehicle, may be realized, according to the subject vehicle's torque map, based on data received into the subject vehicle's electronic control unit through sensors for detecting surface slope and sensors for detecting vehicle pitch, which may be located on the subject vehicle.

20 Claims, 2 Drawing Sheets

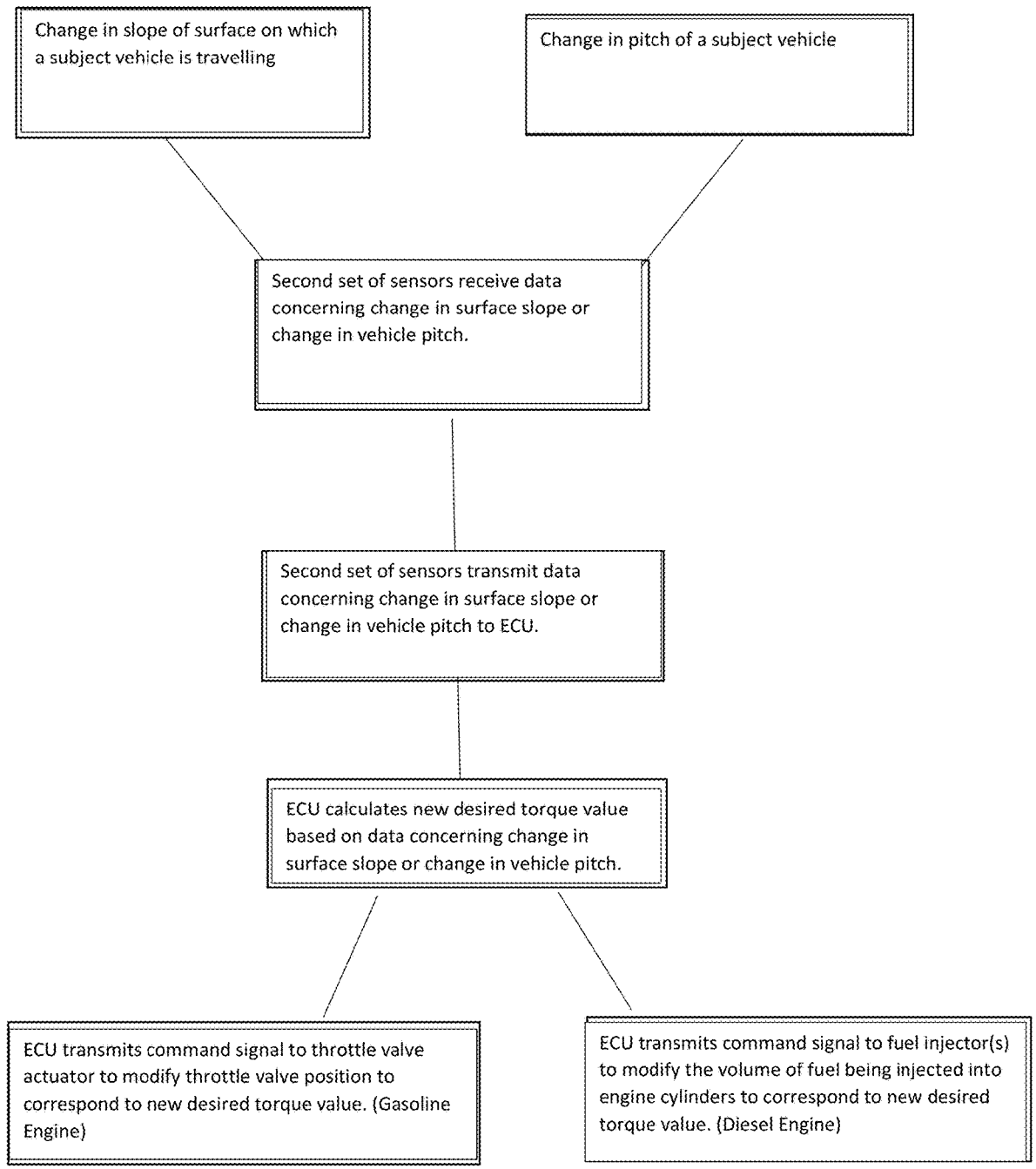

SYSTEMS AND METHODS FOR MANAGING DIESEL-POWERED VEHICLE FOLLOWING DISTANCE

FIELD OF THE INVENTION

The present invention relates to systems and methods for managing the distance between a subject vehicle, with an adaptive cruise control feature activated, and a target vehicle preceding the subject vehicle. The present invention relates to systems and methods for managing vehicle following distance by managing the amount of torque requested in the subject vehicle.

BACKGROUND

Conventional cruise control may be used to maintain a substantially constant vehicle speed that has been pre-set. Early forms of conventional cruise control maintained the substantially constant vehicle speed by adjusting throttle valve position using a cable. As technology progressed, cruise control systems began to operate electronically. In a vehicle containing a gasoline engine, the vehicle's electronic control unit (ECU) will send a command signal to modify throttle valve opening as necessary to maintain substantially constantly the pre-set vehicle speed. In a vehicle containing a diesel engine, the vehicle's ECU will send a command signal to adjust the amount of fuel being injected into the engine cylinders as necessary to maintain substantially constantly the pre-set vehicle speed.

Conventional adaptive cruise control (ACC) likewise may be used to maintain a substantially constant vehicle speed. Conventional ACC additionally includes the ability to maintain a substantially constant following distance in a subject vehicle with ACC activated relative to a preceding target vehicle. Conventional ACC achieves this using a series of radar sensors that detect the target vehicle's speed and distance and modifying the subject vehicle's speed as necessary to maintain substantially constant following distance.

Thus, if the target vehicle decelerates, the ACC system, through the use of radar sensors, may detect such deceleration. These radar sensors may communicate this deceleration to the subject vehicle's ECU. The ECU may then, in a vehicle containing a gasoline engine, transmit command signals to throttle valve actuators to adjust degree of throttle valve opening in order to effectuate a corresponding deceleration of the subject vehicle. By contrast, if the ACC in a vehicle containing a gasoline engine detects, through the use of radar sensors, that the target vehicle has moved to a different lane, or that conditions otherwise permit of acceleration, the ECU may then transmit command signals to throttle valve actuators to adjust degree of throttle valve opening in order to effectuate a corresponding acceleration of the subject vehicle up to the pre-set vehicle speed.

Analogously, in vehicles containing a diesel engine, when a subject vehicle detects that a preceding target vehicle has decelerated, the ECU of the subject vehicle may transmit a command signal to fuel injectors to decrease the volume of fuel injected into engine cylinders of the subject vehicle. Alternatively, when the subject vehicle detects that the target vehicle has switched to a different lane, or that conditions otherwise permit of acceleration, the ECU may then transmit a command signal to fuel injectors to increase the volume of fuel injected into the engine cylinders.

Torque is one factor that impacts vehicle speed. Torque is the product of force applied to an engine's crankshaft multiplied by the distance through which that force travels. Each vehicle engine has a peak torque. If actual torque exceeds peak torque, the engine may no longer operate optimally.

When a driver of a vehicle presses on an accelerator pedal to signal acceleration, the ECU will send a command for increased engine torque. There are a number of ways by which the ECU may effectuate an increase in torque. Changes in torque may be effectuated by, for example, modifying the degree of throttle valve opening and/or changing the amount of time during which throttle valves are open in gasoline engines, and by modifying the volume of fuel injected into cylinders of an engine block in diesel engines. These same sorts of methods may be used when a driver reduces force on an accelerator pedal in order to effectuate a reduction in torque.

In vehicles containing a gasoline engine, the ECU maintains an engine torque map. This torque map comprises a series of values correlating engine speed (i.e., revolutions per minute of the crankshaft or "RPMs"), throttle valve position, and engine torque. Based on this torque map, for a given engine speed and throttle valve position, a corresponding reference engine torque may be ascertained. Using sensors on the engine that infer actual engine torque, it may then be determined whether the engine is functioning properly with respect to the torque being applied to the engine's crankshaft. If there is a significant difference between the reference torque and the actual torque, the engine may not be functioning properly.

In an analogous manner, in vehicles containing a diesel engine, the ECU maintains a fuel map. This fuel map dictates the volume of fuel that should be injected into engine cylinders to generate a certain reference torque.

When a driver of a gasoline-powered vehicle lifts his or her foot off of the accelerator pedal, it is the engine torque map that determines by how much the throttle valves should close. Similarly, when a driver of a vehicle containing a diesel engine lifts his or her foot off of the accelerator pedal, it is the fuel map that determines the extent of reduction of fuel that will be injected into the engine cylinders.

When a driver of a gasoline-powered vehicle presses on the accelerator pedal, it is the engine torque map that determines by how much the throttle valves should open. Similarly, when a driver of a vehicle containing a diesel engine presses on the accelerator pedal, it is the fuel map that determines the extent of increase in the volume of fuel that will be injected into the engine cylinders.

Thus, within the ECU of a vehicle containing a gasoline engine, it is the engine torque map that determines the throttle valve position necessary to meet the driver's torque demand. Within the ECU of a vehicle containing a diesel engine, it is the fuel map that determines the volume of fuel that will be injected into the engine cylinders to meet the driver's torque demand.

As discussed above, when ACC is active, there are instances when deceleration of the subject vehicle may be required in order to maintain a substantially constant following distance relative to the target vehicle. Different deceleration responses, however, may be required depending on, for example, the slope of the surface on which the subject vehicle is travelling. A vehicle travelling on a downward sloping surface may require a higher percent torque reduction in order to maintain substantially constant following distance than a vehicle travelling on a surface with a positive slope or on a flat or substantially flat surface because of acceleration due to gravity acting upon the subject vehicle when travelling on a downward sloping surface.

Similarly, different deceleration responses may be required of the ACC system depending on the pitch of the subject vehicle. A vehicle exhibiting a negative pitch may require a higher percent torque reduction than a vehicle exhibiting a positive pitch because of acceleration due to gravity acting upon the subject vehicle exhibiting a negative pitch.

Accordingly, information pertaining to slope of the surface on which the subject vehicle is travelling and information pertaining to pitch of the subject vehicle may inform identification of a new torque value necessary to maintain substantially constant following distance relative to a target vehicle.

In vehicles equipped with conventional ACC systems, in order to accurately adjust desired torque values given a downward sloping surface or a decrease in vehicle pitch (i.e., so as to maintain a substantially constant following distance behind a target vehicle), the system may not be requesting an optimal new desired torque value when travelling on an upward sloping surface or a substantially flat surface, or when vehicle pitch increases. This is because conventional ACC systems do not adequately control for factors such as change in slope of a surface and change in pitch of the subject vehicle. Rather, torque reduction models programmed into conventional ACC systems are calibrated based on a downward sloping environment and, therefore, may over-compensate with respect to torque reduction when the subject vehicle is travelling on an upward sloping or substantially flat surface, or when vehicle pitch increases.

SUMMARY OF THE INVENTION

An aspect of this disclosure advantageously provides for a system, implementable in a subject vehicle equipped with adaptive cruise control technology, for maintaining a substantially constant following distance relative to a preceding target vehicle, notwithstanding change in slope of a surface on which the subject vehicle is travelling and notwithstanding change in pitch of the subject vehicle. An aspect of this disclosure advantageously provides for such a system wherein, upon receipt of data from sensors on the subject vehicle for detecting driving surface slope and vehicle pitch, an electronic control unit of the subject vehicle identifies a new desired torque value and effectuates a change in the volume of fuel injected into engine cylinders (in a diesel engine), or effectuates a change in throttle valve position (in a gasoline engine), as necessary to realize the new desired torque. An aspect of this disclosure advantageously provides for associated methods of operating the subject vehicle when ACC has been activated utilizing systems of the present disclosure so as to maintain substantially constant following distance relative to a preceding target vehicle.

According to aspects of systems enabled by this disclosure, slope-detecting sensors as discussed herein may be positioned, without limitation, on a vehicle's frame within approximately six inches from such vehicle's transmission and/or within approximately six inches from such vehicle's wheel well. In instances where systems and methods of the present disclosure are deployed in a truck weighing more than approximately 10,000 pounds, sometimes referred to by those skilled in the art as "heavy trucks," slope-detecting sensors as discussed herein may be located on the vehicle's transmission and/or elsewhere on such vehicle's powertrain. The foregoing positioning is likewise suitable for pitch-detecting sensors contemplated by the present disclosure. Those of skill in the art will readily appreciate alternative suitable locations for placement of such slope-detecting sensors and pitch-detecting sensors.

According to an aspect of the present disclosure, throttle valve actuators that may be used in connection with systems and methods of the present disclosure include a stepper motor and a servo motor, without limitation.

BRIEF DESCRIPTION OF THE DRAWINGS

FIG. 4 is a flow chart depicting steps of methods according to the present disclosure.

DETAILED DESCRIPTION

Figure 1:
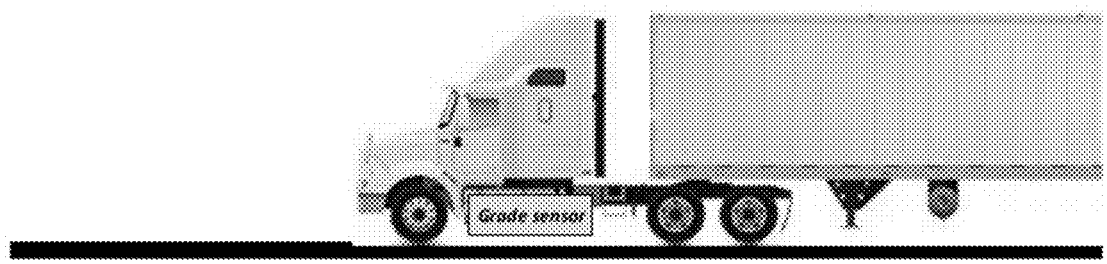
FIG. 1 depicts a left side view of a vehicle that is travelling on a substantially flat surface and is equipped with sensors for determining slope of the surface, as contemplated by systems and methods of the present invention.

The following disclosure concerns systems and methods, implementable in vehicles equipped with ACC, where the ACC feature is activated, for managing vehicle following distance by managing torque and torque reduction in a subject vehicle. Skilled artisans will appreciate additional embodiments of systems and methods of the present disclosure that extend beyond the examples of this disclosure.

When reading this disclosure, singular forms should be read to contemplate and disclose plural alternatives. Similarly plural forms should be read to contemplate and disclose singular alternatives. Conjunctions should be read as inclusive unless stated otherwise.

Expressions such as "at least one of A, B, and C" should be read to permit any one of A, B, or C, alone or in combination with the remaining elements. Additionally, such groups may include multiple instances of one or more elements in that group, which may be included with other elements of that group. All numbers, measurements, and values are given as approximations unless expressly stated otherwise.

Terms and expressions used throughout this disclosure are to be interpreted broadly. Terms are intended to be understood respective to the definitions provided by this specification. Technical dictionaries and common meanings understood within the applicable art are intended to supplement these definitions. In instances where no suitable definition can be determined from the specification or from technical dictionaries, such terms should be understood according to their plain and common meaning. However, any definitions provided by the specification will govern above all other sources.

Various objects, features, aspects, and advantages described by this disclosure will become more apparent from the following detailed description, along with the accompanying drawings.

For purposes of clearly describing the components, features, and method steps discussed throughout this disclosure, some frequently used terms will now be defined. The term "subject vehicle," as it is used throughout this disclosure, shall mean a vehicle, equipped with ACC and operating with ACC activated, comprising a system of the present disclosure and/or operating according to a method of the present disclosure. The term "target vehicle," as it is used throughout this disclosure, shall mean a vehicle located some distance in front of a subject vehicle and with respect to which speed of the subject vehicle is calibrated so as to maintain substantially constant following distance.

Various aspects of the disclosure will now be described in detail, without limitation. In the following disclosure, systems and methods for controlling vehicle following distance by managing torque and torque reduction in a subject vehicle, will be discussed. Those of skill in the art will appreciate that alternative labeling of the components, features, and method steps may be provided, which is consistent with the scope and spirit of this disclosure. Skilled readers should not view inclusion of any alternative labels as limiting in any way.

ACC systems are commonly found in many different makes and models of vehicles today. ACC systems in a subject vehicle may be utilized to maintain a substantially constant following distance behind a preceding target vehicle located in front of the subject vehicle. When a vehicle with a conventional ACC system activated is travelling on a downward sloping surface, the ACC system may decrease the desired torque value to off-set acceleration due to gravity caused by the downward slope of the surface. Such off-set may be necessary to maintain a substantially constant following distance relative to a target vehicle given the increase in speed due to the downward sloping surface. Such decreased desired engine torque may be communicated to the ECU. The ECU may then, in a gasoline-powered vehicle, adjust throttle valve position to effectuate the new desired torque. Alternatively, in a vehicle containing a diesel engine, the ECU may modify the volume of fuel being injected into the vehicle's engine cylinders to effectuate the new desired torque.

In a gasoline-powered vehicle, the modified throttle valve positioning adopted to effectuate the new desired torque value may be determined by a torque map. Such torque map may be programmed into the ECU. As those of skill in the art will appreciate, torque maps may be used to identify, for a desired engine torque output, necessary throttle valve position, given an engine speed (i.e., revolutions per minute of a crankshaft).

In a vehicle containing a diesel engine, the modified volume of fuel being injected into the engine cylinders to effectuate the new desired torque value may be determined by a fuel map. Such fuel map may be programmed into the ECU. As those of skill in the art will appreciate, fuel maps may be used to identify, for a desired engine torque output, the necessary volume of fuel that must be injected into the engine cylinders.

Conventional ACC systems, when there is a change in slope of the surface on which the subject vehicle is travelling, request a new desired torque that is calibrated to a downward slope. This new requested torque is, therefore, not optimal for upward sloping and substantially flat surfaces. Systems and methods of the present disclosure solve this problem by utilizing sensors that are communicatively and operatively connected to the ECU and transmit data to the ECU regarding slope of the surface on which the subject vehicle is travelling. With this information regarding slope of the surface, a more appropriate new desired torque may be identified by the ECU when there is a change in slope of the driving surface.

In an alternative embodiment, systems and methods of the present disclosure comprise a series of sensors that detect pitch of a subject vehicle. When vehicle pitch changes, a new desired torque will be identified to off-set forces causing the change in pitch. With this information regarding pitch of the subject vehicle, a more appropriate new desired torque may be identified by the ECU when there is a change in pitch than with conventional ACC systems.

Systems and methods of the present disclosure may be utilized in a subject vehicle. Systems and methods of the present disclosure may be utilized to maintain a substantially constant following distance behind a target vehicle.

Components of systems of the present disclosure may include, without limitation, an ECU.

Components of systems of the present disclosure may include, without limitation, radar sensors capable of detecting following distance relative to a target vehicle and capable of detecting speed of the target vehicle. Such sensors may be communicatively and operatively connected to the ECU. Those of skill in the art will readily appreciate suitable locations throughout the subject vehicle for placement of such radar sensors. Without limitation, such radar sensors may be located behind the grill of a subject vehicle.

Components of systems of the present disclosure may include, without limitation, sensors that are capable of detecting slope of the surface on which the subject vehicle is travelling. Such sensors may be communicatively and operatively connected to the ECU. Such sensors may be located throughout the subject vehicle at any position that is substantially stable when the subject vehicle is being driven. Without limitation, such sensors may be located on a vehicle's frame within approximately six inches from such vehicle's transmission and/or within approximately six inches from such vehicle's wheel well. In instances where systems and methods of the present disclosure are deployed in a truck weighing more than approximately 10,000 pounds (referred to at times by those skilled in the art as a "heavy truck"), slope-detecting sensors as discussed herein may be located on the vehicle's transmission and/or elsewhere on such vehicle's powertrain. Those of skill in the art will readily appreciate alternative suitable locations for placement of the slope-detecting sensors and pitch-detecting sensors discussed herein.

Components of systems of the present disclosure may include, without limitation, sensors that are capable of detecting degree of throttle valve opening in a subject vehicle. Such sensors may be communicatively and operatively connected to the ECU. Those of skill in the art will readily appreciate suitable locations for placement of such sensors.

Components of systems of the present disclosure may include, without limitation, a throttle valve actuator. Such throttle valve actuator may, without limitation, comprise a stepper motor or a servo motor. Those of skill in the art will readily appreciate suitable locations for placement of such throttle valve actuators.

Systems of the present disclosure, as well as related methods of the present disclosure, are intended to operate in vehicles equipped with ACC when such ACC has been activated.

Figure 2:
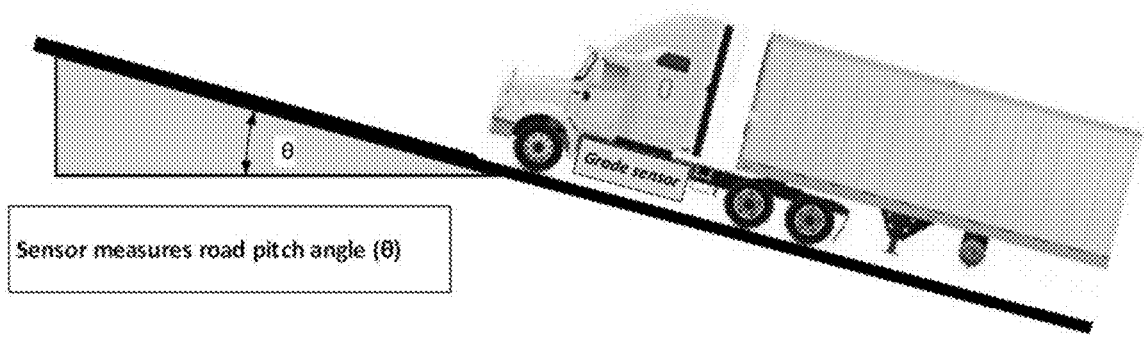
FIG. 2 depicts a left side view of a vehicle that is travelling on an upward sloping surface and is equipped with sensors for determining slope of the surface, as contemplated by systems and methods of the present invention.
Figure 3:
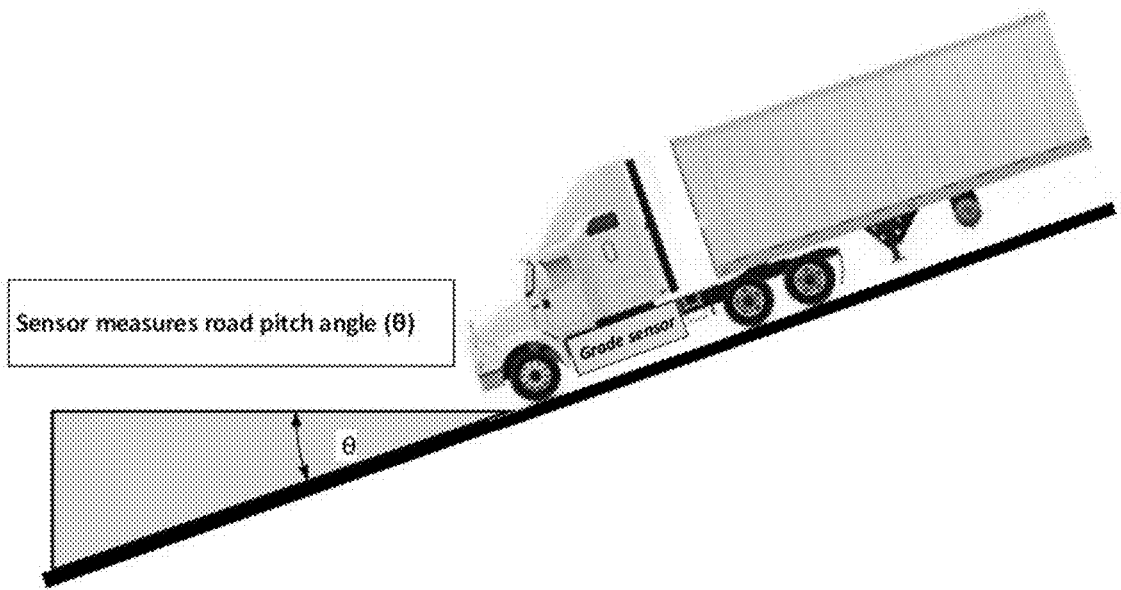
FIG. 3 depicts a left side view of a vehicle that is travelling on a downward sloping surface and is equipped with sensors for determining slope of the surface, as contemplated by systems and methods of the present invention.

According to systems and methods of the present disclosure, and referring to FIGS. 1-3, when a vehicle encounters a change in slope of the surface on which it is travelling, sensors transmit a signal to the ECU communicating data regarding the change in slope of the surface. Based on the data concerning change in road slope received from such sensors, the ECU may calculate a new desired torque value necessary to maintain substantially constant following distance relative to a target vehicle.

Upon receipt by the ECU of such road slope data, in vehicles containing a gasoline-powered engine, the ECU, according to systems and methods of the present disclosure, may calculate a new desired torque value and may output to the throttle valve actuator a command signal to modify throttle valve opening to a position that corresponds to the new desired torque value. Such modified throttle valve position may be determined according to a torque map programmed into the ECU.

In instances where systems and methods of the present disclosure are utilized in connection with a vehicle containing a diesel engine, upon receipt by the ECU of data indicating a change in road slope, the ECU may calculate a new desired torque value and may output a command signal to fuel injectors to modify the volume of fuel to be injected into the engine cylinders to correspond to the new desired torque value. Those of skill in the art will readily appreciate that different types of fuel injectors may be used in connection with systems and methods of the present disclosure. Without limitation, such fuel injectors may comprise a sequential fuel injection system; a direct fuel injection system; a single-point fuel injection system; or a multi-point fuel injection system.

Such modifications in throttle valve position or modifications in the amount of fuel being to be injected into the engine cylinders may be effectuated in order to achieve a new desired torque value. Such new torque value may be necessary in order to maintain a substantially constant following distance relative to a target vehicle where there has been a change in slope of the surface on which the subject vehicle is travelling.

In an alternative embodiment, systems of the present disclosure may comprise sensors capable of detecting pitch of the subject vehicle in lieu of or in addition to sensors for detecting slope of a surface on which the subject vehicle is travelling.

According to such embodiment, when pitch of the subject vehicle changes, sensors located on the subject vehicle transmit a signal to the ECU communicating data concerning the change in vehicle pitch. Such sensors may be located at any position on the subject vehicle that preserves effectiveness of the sensors. Without limitation, such sensors may be positioned as reflected in FIGS. 1-3. According to aspects of systems enabled by this disclosure, pitch-detecting sensors as discussed herein may be positioned, without limitation, on a vehicle's frame within approximately six inches from such vehicle's transmission and/or within approximately six inches from such vehicle's wheel well. In instances where systems and methods of the present disclosure are deployed in a truck weighing more than approximately 10,000 pounds (referred to at times by those skilled in the art as a "heavy truck"), pitch-detecting sensors as discussed herein may be located on the vehicle's transmission and/or elsewhere on such vehicle's powertrain. Those of skill in the art will readily appreciate alternative suitable locations for placement of such sensors.

Based on the data concerning change in vehicle pitch, the ECU may calculate a new desired torque value necessary to maintain substantially constant following distance relative to a target vehicle.

Upon receipt by the ECU of such vehicle pitch data, in vehicles containing a gasoline-powered engine, the ECU, according to systems and methods of the present disclosure, may output to the throttle valve actuator a command signal requiring adjustment of throttle valve opening to a position that corresponds to the new desired torque value.

Upon receipt by the ECU of such vehicle pitch data, in vehicles containing a diesel engine, the ECU, according to systems and methods of the present disclosure, may output a command signal requiring modification of the volume of fuel being injected into the engine's cylinders to a volume that corresponds to the new desired torque value.

Such modifications in throttle valve position and to the volume of fuel injections may be effectuated in order to realize a new desired torque value. Such new torque value may be necessary in order to maintain a substantially constant following distance relative to a target vehicle where there has been a change pitch of the subject vehicle.

While various aspects of systems and methods enabled by this disclosure have been described above, the description of this disclosure is intended to illustrate and not limit the scope of the invention. The invention is defined by the scope of the claims and not the illustrations and examples provided in the above disclosure. Skilled artisans will appreciate additional aspects of the systems and methods enabled by this disclosure, which may be realized in alternative embodiments, after having the benefit of the above disclosure. Other aspects, advantages, embodiments, and modifications are within the scope of the claims.

The invention claimed is:

1. A system, implementable in a subject vehicle equipped with adaptive cruise control technology, for maintaining a substantially constant following distance from a target vehicle comprising:
   (a) a diesel engine comprising a plurality of fuel injectors;
   (b) an electronic control unit;
   (c) a first set of sensors located throughout the subject vehicle, which are communicatively and operatively connected to the electronic control unit, wherein said sensors are capable of detecting following distance relative to the target vehicle and the speed of the target vehicle; and
   (d) a second set of sensors located throughout the subject vehicle, which are communicatively and operatively connected to the electronic control unit, wherein said sensors are capable of detecting slope of a surface on which the subject vehicle is travelling;
   wherein, when the subject vehicle encounters a change in slope of a surface on which it is travelling, the second set of sensors transmits a signal to the electronic control unit communicating data concerning the change in slope of the surface;
   wherein the electronic control unit, based on the data concerning change in slope received from the second set of sensors, calculates a new desired torque value necessary to maintain substantially constant following distance relative to a target vehicle; and
   wherein the electronic control unit outputs a command signal to adjust the volume of fuel injected into the engine's cylinders to a volume that corresponds to the new desired torque value.

2. The system of claim 1, wherein the second set of sensors are located on the frame of the subject vehicle.

3. The system of claim 1, wherein the second set of sensors are located on the transmission of the subject vehicle.

4. The system of claim 1, wherein the plurality of fuel injectors comprise a sequential fuel injection system.

5. The system of claim 1, wherein the plurality of fuel injectors comprise a direct fuel injection system.

6. A system, implementable in a subject vehicle equipped with adaptive cruise control technology, for maintaining a substantially constant following distance from a target vehicle comprising:
  (a) a diesel engine comprising a plurality of fuel injectors;
  (b) an electronic control unit;
  (c) a first set of sensors located throughout the subject vehicle, which are communicatively and operatively connected to the electronic control unit, wherein said sensors are capable of detecting following distance relative to the target vehicle and the speed of the target vehicle; and,
  (d) a second set of sensors located throughout the subject vehicle, which are communicatively and operatively connected to the electronic control unit, wherein said sensors are capable of detecting pitch of the subject vehicle;
  wherein, when the pitch of the subject vehicle changes, the second set of sensors transmit a signal to the electronic control unit communicating the change in vehicle pitch;
  wherein the electronic control unit, based on the data concerning change in vehicle pitch received from the second set of sensors, calculates a new desired torque value necessary to maintain substantially constant following distance relative to the target vehicle; and
  wherein the electronic control unit outputs a command signal to adjust the volume of fuel injected into the engine's cylinders to a volume that corresponds to the new desired torque value.

7. The system of claim 6, wherein the second set of sensors are located on the frame of the subject vehicle.

8. The system of claim 6, wherein the second set of sensors are located on the transmission of the subject vehicle.

9. The system of claim 6, wherein the plurality of fuel injectors comprise a sequential fuel injection system.

10. The system of claim 6, wherein the plurality of fuel injectors comprise a direct fuel injection system.

11. A method, implementable in a subject vehicle equipped with adaptive cruise control technology, for maintaining a substantially constant following distance relative to a preceding target vehicle comprising:
  (a) providing a diesel engine comprising a plurality of fuel injectors;
  (b) providing an electronic control unit;
  (c) providing a first set of sensors located throughout the subject vehicle, which are communicatively and operatively connected to the electronic control unit, wherein said sensors are capable of detecting following distance relative to the target vehicle and the speed of the target vehicle;
  (d) providing a second set of sensors located throughout the subject vehicle, which are communicatively and operatively connected to the electronic control unit, wherein said sensors are capable of detecting slope of the surface on which the subject vehicle is travelling; and
  (e) activating adaptive cruise control in the subject vehicle;
  wherein, when the subject vehicle encounters a change in slope of the surface on which it is travelling, the second set of sensors transmits a signal to the electronic control unit communicating data concerning the change in slope of the surface;
  wherein the electronic control unit, based on the data concerning change in slope received from the second set of sensors, calculates a new desired torque value necessary to maintain substantially constant following distance relative to a target vehicle; and
  wherein the electronic control unit outputs a command signal to adjust the volume of fuel injected into the engine's cylinders to a volume that corresponds to the new desired torque value.

12. The method of claim 11, wherein the second set of sensors are located on the frame of the subject vehicle.

13. The method of claim 11, wherein the second set of sensors are located on the transmission of the subject vehicle.

14. The method of claim 11, wherein the plurality of fuel injectors comprise a sequential fuel injection system.

15. The method of claim 11, wherein the plurality of fuel injectors comprise a direct fuel injection system.

16. A method, implementable in a subject vehicle equipped with adaptive cruise control technology, for maintaining a substantially constant following distance relative to a preceding target vehicle comprising:
  (a) providing a diesel engine comprising a plurality of fuel injectors;
  (b) providing an electronic control unit;
  (c) providing a first set of sensors located throughout the subject vehicle, which are communicatively and operatively connected to the electronic control unit, wherein said sensors are capable of detecting following distance relative to the target vehicle and the speed of the target vehicle;
  (d) providing a second set of sensors located throughout the subject vehicle, which are communicatively and operatively connected to the electronic control unit, wherein said sensors are capable of detecting pitch of the subject vehicle; and,
  (e) activating adaptive cruise control in the subject vehicle;
  wherein, when the pitch of the subject vehicle changes, the second set of sensors transmit a signal to the electronic control unit communicating the change in vehicle pitch;
  wherein the electronic control unit, based on the data concerning change in vehicle pitch received from the second set of sensors, calculates a new desired torque value necessary to maintain substantially constant following distance relative to the target vehicle; and
  wherein the electronic control unit outputs a command signal to adjust the volume of fuel injected into the engine's cylinders to a volume that corresponds to the new desired torque value.

17. The method of claim 16, wherein the second set of sensors are located on the frame of the subject vehicle.

18. The method of claim 16, wherein the second set of sensors are located on the transmission of the subject vehicle.

19. The method of claim 16, wherein the plurality of fuel injectors comprise a sequential fuel injection system.

20. The method of claim 16, wherein the plurality of fuel injectors comprise a direct fuel injection system.

* * * * *